United States Patent [19]

Tanaka et al.

[11] Patent Number: 4,842,388
[45] Date of Patent: Jun. 27, 1989

[54] SINGLE OPTICAL LENSE WITH DIFFRACTION LIMIT CONVERGING CAPABILITY AND WIDE FIELD ANGLE

[75] Inventors: Yasuhiro Tanaka, Nishinomiya; Yasuo Nakajima, Ibaraki; Yoshitomi Nagaoka, Neyagawa, all of Japan

[73] Assignee: Matsushita Electric Industrial Co., Ltd., Japan

[21] Appl. No.: 60,618

[22] Filed: Jun. 11, 1987

[30] Foreign Application Priority Data

Jul. 2, 1986 [JP] Japan ................... 61-155383

[51] Int. Cl.$^4$ ............................... G02B 13/18
[52] U.S. Cl. .................................... 350/432
[58] Field of Search ............... 350/432, 433, 434, 435

[56] References Cited

U.S. PATENT DOCUMENTS

| | | | |
|---|---|---|---|
| 3,508,811 | 4/1970 | Yoshida | 350/432 |
| 4,027,952 | 6/1977 | Hugues | 350/432 |
| 4,449,792 | 5/1984 | Arai et al. | 350/432 |
| 4,571,034 | 2/1986 | Nakamura | 350/432 |

FOREIGN PATENT DOCUMENTS

| | | |
|---|---|---|
| 50-156945 | 12/1975 | Japan . |
| 57-76512 | 5/1982 | Japan . |
| 57-201210 | 9/1982 | Japan . |
| 59-23313 | 2/1984 | Japan . |
| 59-26714 | 2/1984 | Japan . |
| 60-120310 | 6/1985 | Japan . |
| 60-126616 | 7/1985 | Japan . |
| 61-56314 | 3/1986 | Japan . |

*Primary Examiner*—Bruce Y. Arnold
*Assistant Examiner*—Scott J. Sugarman
*Attorney, Agent, or Firm*—Wenderoth, Lind & Ponack

[57] ABSTRACT

A single lens having first and second aspherical surfaces each having a positive power is usable for, an objective lens of an optical pickup for an optical recording medium. The lens satisfies the following conditions:

$$0.1 < |m| < 0.5$$

$$0.9 < (d/f) < 1.2$$

where m denotes magnification; d denotes thickness of the lens; and f denotes focal length of the lens.

3 Claims, 10 Drawing Sheets

FIG. 3
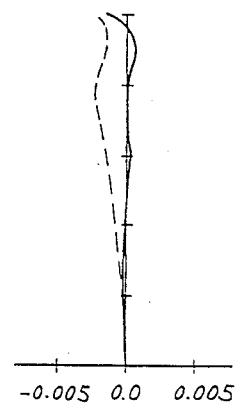
NA 0.45
(a)
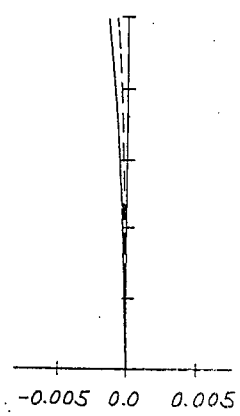
0.14
(b)
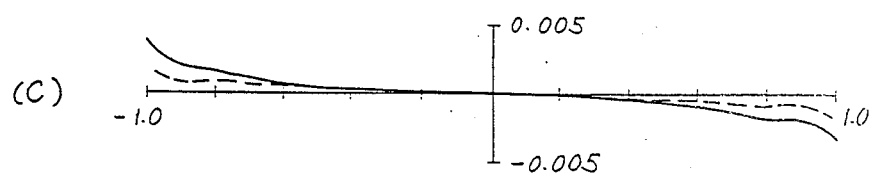
(c)
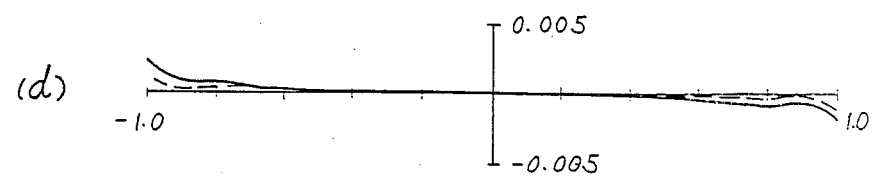
(d)
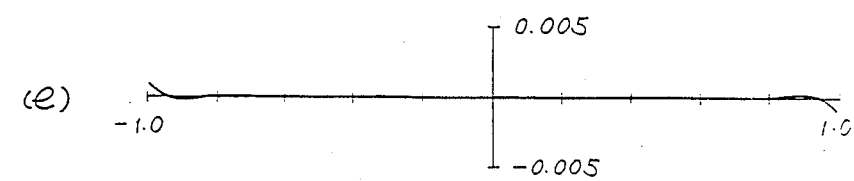
(e)

FIG. 4
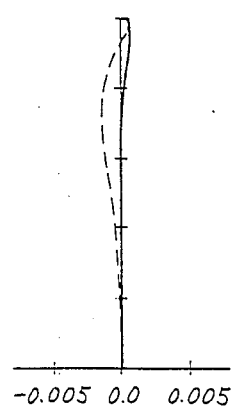
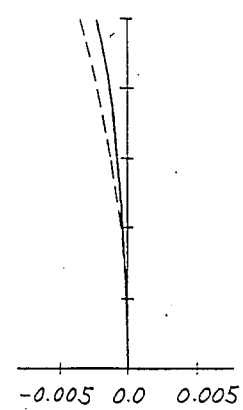
(a) NA 0.45
(b) 0.14
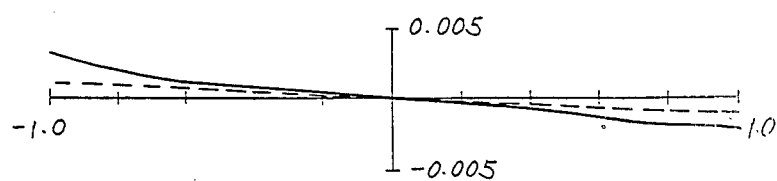
(c)
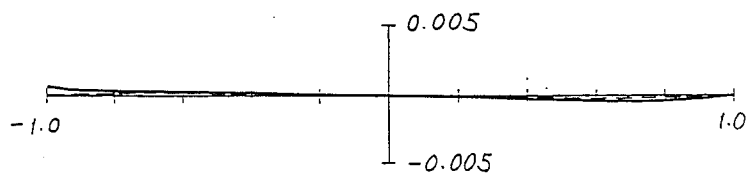
(d)
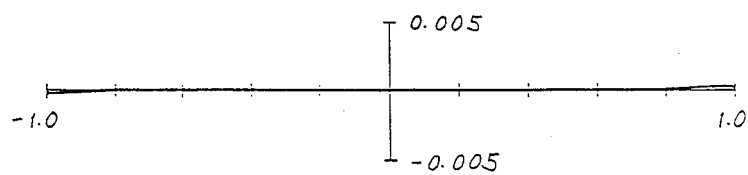
(e)

FIG. 5
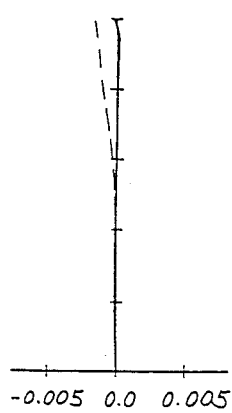
NA 0.45
(a)
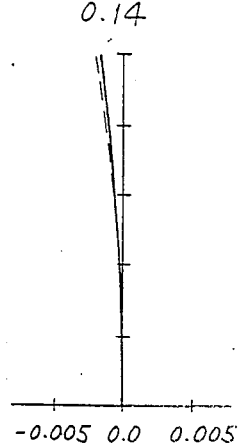
0.14
(b)
(c) 
(d) 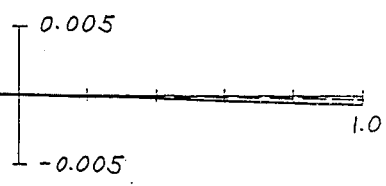
(e) 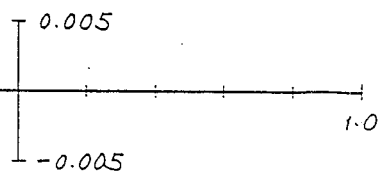

FIG. 6
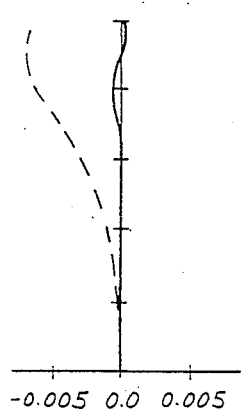
NA 0.45
(a)
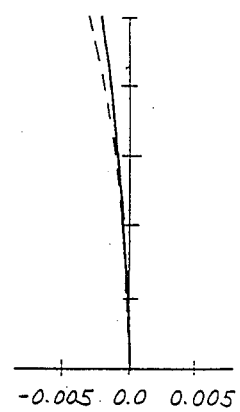
0.14
(b)
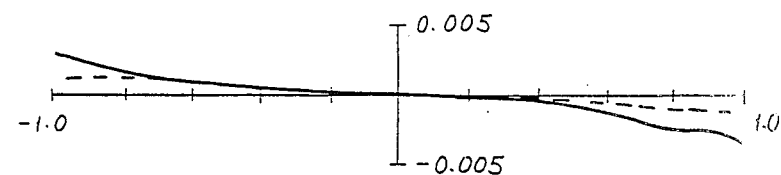
(c)
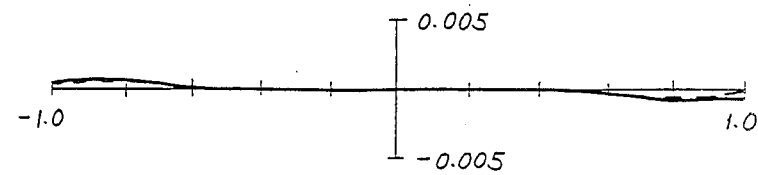
(d)
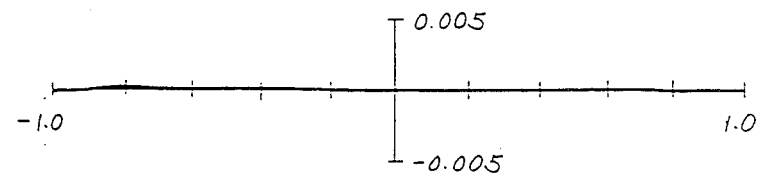
(e)

FIG. 9
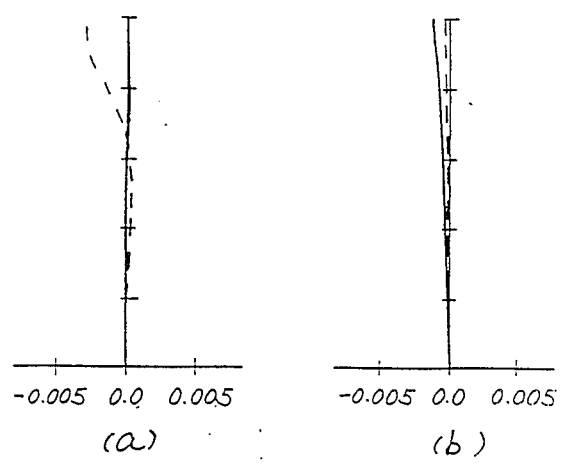
(a)   (b)
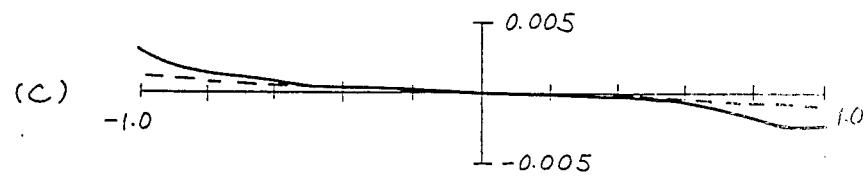
(c)
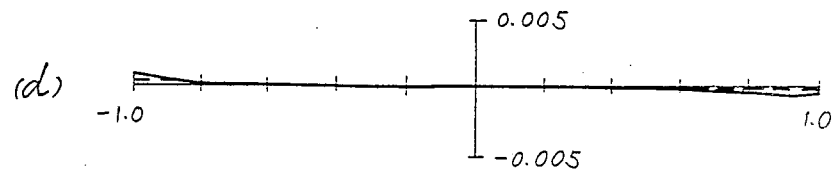
(d)
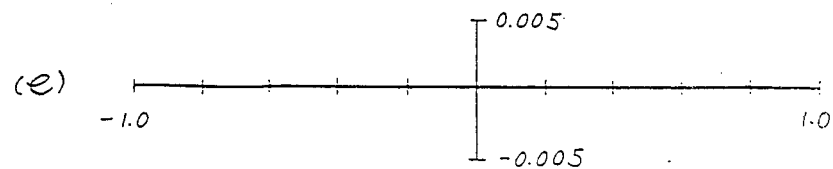
(e)

SINGLE OPTICAL LENSE WITH DIFFRACTION LIMIT CONVERGING CAPABILITY AND WIDE FIELD ANGLE

BACKGROUND OF THE INVENTION

1. Field of the Invention

The present invention relates to a single lens usable as an objective lens which is used in an optical pickup of a recording and reproducing apparatus for an optical recording medium such as a video disk, an audio disk, an optical memory disk, and the like, and more particularly to a single lens usable as an objective lens which is capable of converging light from a light source without using a collimator lens.

2. Description of the Prior Art

The objective lens used in an optical pickup of an optical disk recording and reproducing apparatus is required to precisely correct abberations to its diffraction limit, to provide a wide angle of view, to be cheap, and to allow the optical pickup to be as compact as possible. The conventional objective lens, which is made by combining a plurality of spherical glass lenses to fully satisfy the desired optical performance, cannot satisfy those requirements mentioned above.

On the other hand, optical pickups using a single aspherical lens have been proposed by Japanese Patent Laid-Open No. 57-76512 (1982), Japanese Patent Laid-Open No. 57-201210 (1982), Japanese Patent Laid-Open No. 59-26714 (1984), Japanese Patent Laid-Open No. 59-23313 (1984), and Japanese Patent Laid-Open No. 60-120310 (1985), respectively. However, each of these pickups disclosed by these prior arts converts light from a light source into parallel beams by a collimator lens before converging the parallel beams onto the back surface of a disk by the objective lens.

These pickups would be expensive due to the use of a number of lenses, and cannot be made compact due to the necessity of a space for the collimator lens.

Japanese Patent Laid-Open No. 50-156945 (1975) discloses a finite-conjugate aspherical single lens. However, the magnification of this lens is only 1/20, which is very small, and yet, since there is a long distance between the light source and the light-condensing point, compact size cannot easily be realized for the optical pickup. Furthermore, when combining this lens with a laser diode, which is widely used for the light source, the numerical aperture of the lens toward the light-source end is too small to efficiently use the effective quantity of light from the light source.

Japanese Patent Laid-Open No. 60-126616 (1985) proposes a single lens capable of converging a light from a light source. However, taking the manufacturing convenience into account, only one of the two surfaces of the single lens is made aspherical, and as a result, the lens cannot provide a wide field angle. Consequently, in order to effectively use this single lens in the optical pickup, the light source and the lens must be housed in a tubular housing which is movable for tracking. This structure does not allow the optical pickup to be made compact, and in addition, due to its heavy weight, power-saving cannot be realized.

Japanese Patent Laid-Open No. 61-56314 (1986) proposes a bi-aspheric single lens which is capable of satisfying optical performances to the extent of its diffraction limit even when moved independently without being integrally moved with the light source. However, in order to achieve a compact optical pickup, it is essentially required to insert a mirror and a prism in the optical path from the light source to the lens. As a result, in consideration of mounting errors of the mirror, prism, and light source, and also in consideration of the movement of the lens in the tracking direction, a still wider field angle is needed.

SUMMARY OF THE INVENTION

An object of the present invention is to provide a novel single lens which is capable of converging light from a light source to the diffraction limit, and has an extremely wide field angle.

To achieve the above object, the invention provides a novel single lens each of whose first and second surfaces is aspherical and has a positive refractive power, satisfying the following conditions:

$$0.1 < |m| < 0.5 \tag{1}$$

$$0.9 < (d/f) < 1.2 \tag{2}$$

where
    m denotes magnification of the lens;
    d denotes thickness at the center of the lens; and
    f denotes focal length of the lens.

The single lens of the invention provides the following advantages:

(1) Since the single lens of the invention can directly converge the light from the light source to the diffraction limit, a collimator lens for converting the light from the light source into parallel beams can be omitted from the pickup.

(2) Since the single lens of the invention has an extremely wide field angle, it is possible to widen the allowable ranges of the movement of the lens itself in the tracking direction and of the mounting location errors of the laser diode and the mirror and prism which may in some cases be inserted into the optical path of the pickup, thus allowing the pickup to be easily assembled.

(3) Since the working distance can be made long, the focal length can be shortened, so that the lens can be made compact and light in weight.

(4) Mass-production at low cost of the single lens of the invention is possible by using a molding process.

BRIEF DESCRIPTION OF THE DRAWINGS

The present invention will be better understood from the detailed description given hereinbelow and the accompanying drawings which are given by way of illustration only, and thus are not limitative of the invention in which;

FIGS. 3 through 9 are respectively charts showing aberrations generated in the first through seventh preferred embodiments of the single lens of the invention.

DESCRIPTION OF THE PREFERRED EMBODIMENTS

Figure 1:
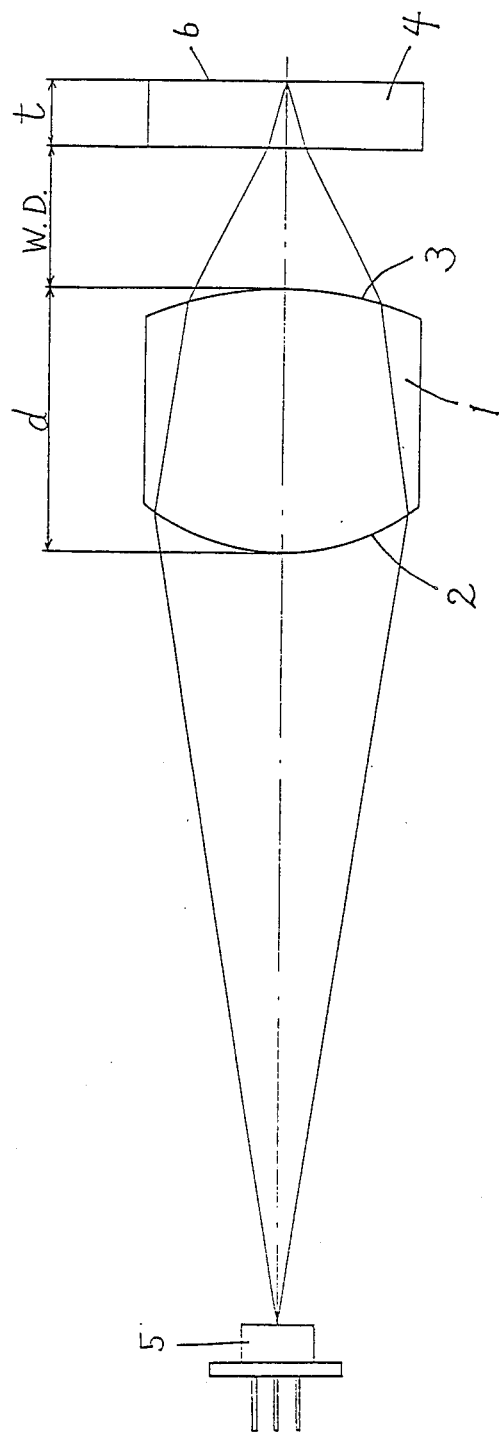
FIG. 1 is a simplified schematic side view of an optical pickup using a single lens of the invention as its objective lens.

FIG. 1 is a simplified schematic side view showing an optical pickup using a single lens of the invention as its objective lens. The optical pickup is provided with an objective lens 1 having a first surface 2 and a second surface 3, and a semiconductor laser diode 5. Beams emitted from the semiconductor laser 5 are refracted through the first and second surfaces 2 and 3 of the lens 1 to be focussed onto the back surface 6 of a recording disk 4. Lens 1 is substantially a single lens with the first and second surfaces 2, 3 each being aspherical and having a positive power, satisfying the following conditions:

$$0.1 < |m| < 0.5 \quad (1)$$

$$0.9 < (d/f) < 1.2 \quad (2)$$

where
m denotes magnification of the lens;
d denotes thickness at the center of the lens; and
f denotes focal length of the lens.

Condition (1) represents the effective range of magnification. If the magnification is below the lower limit of condition (1), the working distance becomes insufficient. Conversely, if the focal length is extended to maintain a sufficient working distance, then the entire size of the lens will be increased, thus making it difficult to realize a compact optical pickup. If the magnification exceeds the upper limit of condition (1), the lens cannot compensate for the coma abberation against the off-axis ray, thus reducing the field angle.

Condition (2) represents the thickness of the lens. If the lens thickness is below the lower limit of condition (2), then the low-order astigmatism will increase. Generally, when both surfaces of a lens are aspherical, both of the spherical and coma abberations can be corrected. However, in order to securely provide a wide field angle, the astigmatism should also be corrected. It is possible to properly balance the low- and high-order astigmatisms within the specific range defined by the above condition (2). If the lens thickness exceeds the upper limit of condition (2), the lens will become excessively thick, thus causing the lens itself to become heavy and incur difficulty in maintaining the required working distance.

Figure 2:
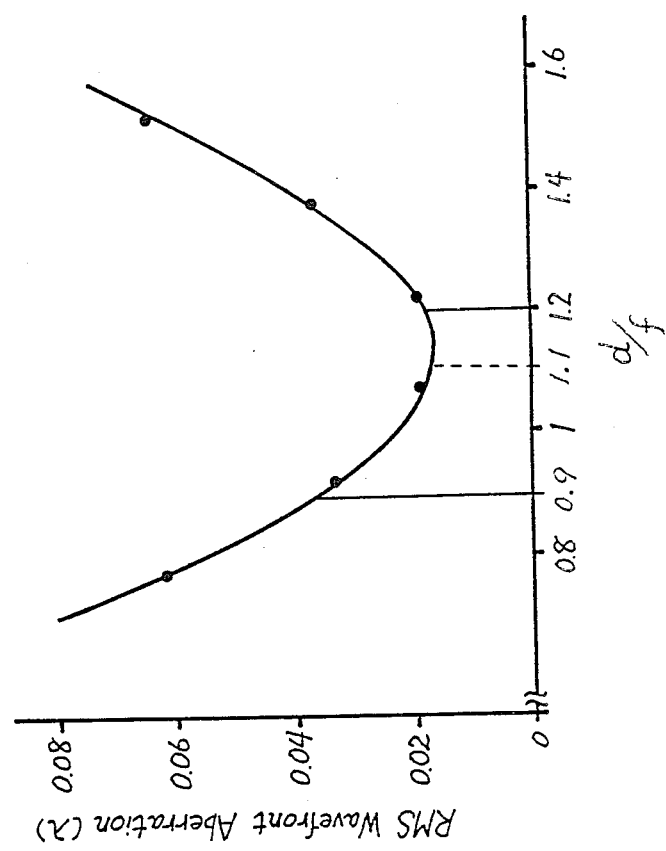
FIG. 2 is a graphical chart showing variations of the off-axis wave-front aberration with respect to the thickness of the single lens of the invention.
Figure 7:
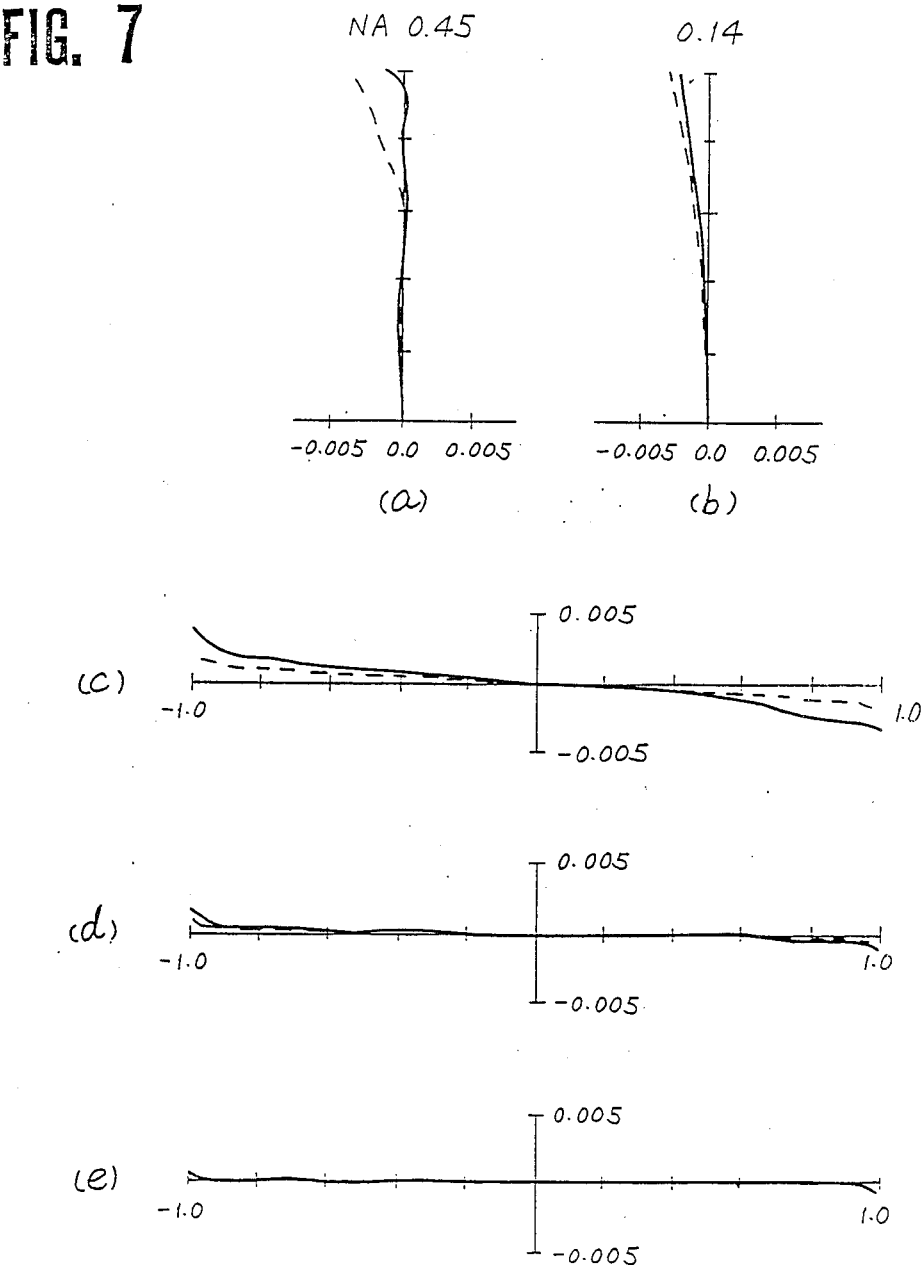
Figure 8:
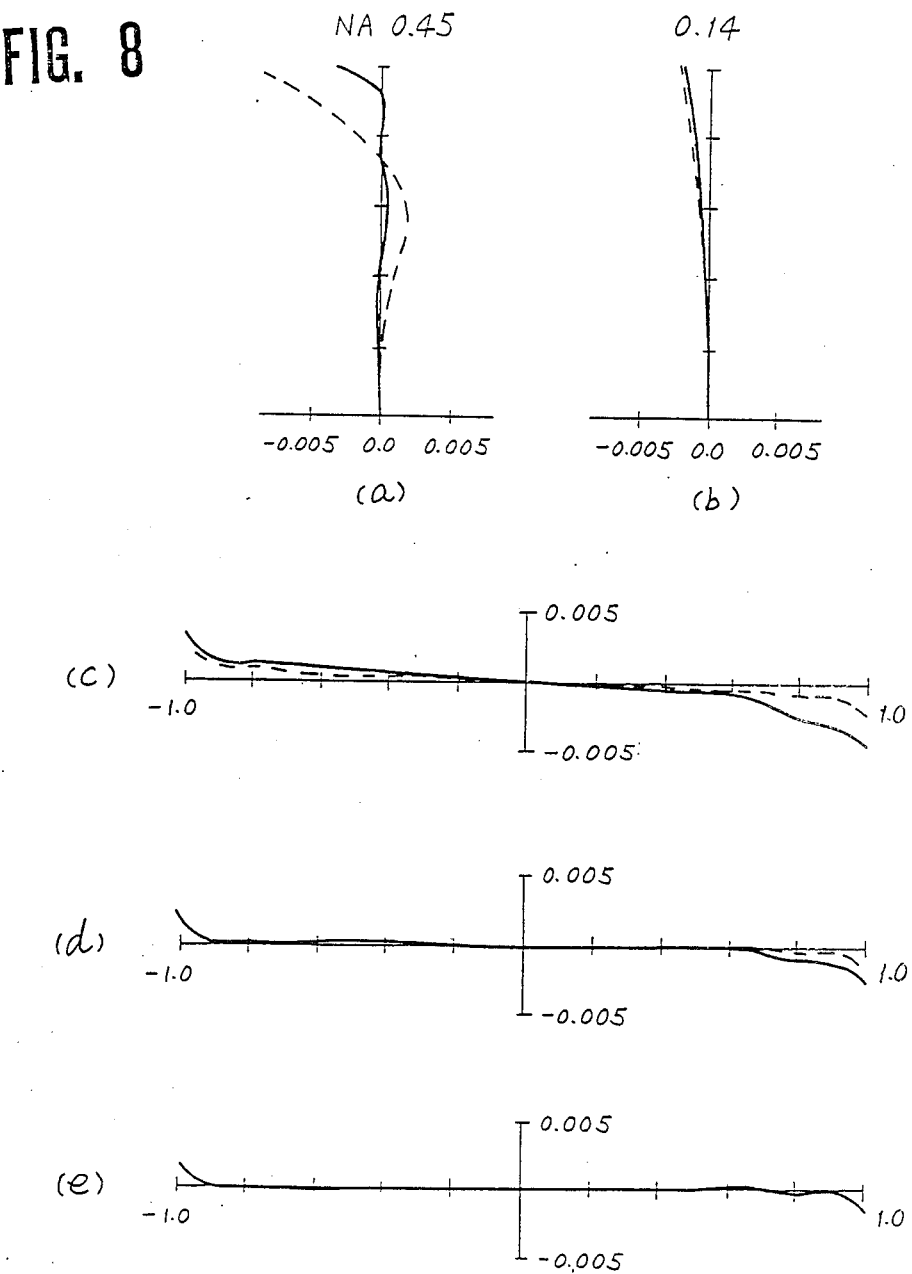

FIG. 2 shows a relationship between the lens thickness and the off-axis optical performance of the single lens of the invention. The horizontal axis denotes d/f, whereas the vertical axis denotes the root mean square value of the wavefront abberation which represents the optical performance of the single lens. The curve in FIG. 2 was obtained by plotting actually designed values under the condition that the angle of view of the lens was 1.3°, the refractive index n=1.65, the magnification m=−0.23, and the on-axis wavefront abberation was almost zero. As shown in FIG. 2, the single lens of the invention exhibits the most satisfactory off-axis optical performance in the region close to d/f=1.1. The single lens provides satisfactory performance even when the thickness is thinner or thicker than the region close to d/f=1.1. However, it is needless to say that the single lens having the smaller thickness has a reduced weight and achieves a longer working distance.

In addition to the above conditions (1) and (2), it is preferable to further satisfy the following conditions:

$$1.6 < n \quad (3)$$

$$0 < K_1 < 1 \quad (4)$$

where
n denotes the refractive index of the lens; and
$K_1$ denotes the conic constant of the first surface.

If the lens refractive index is below the limit of condition (3), even after correcting the spherical abberation, coma abberation, and the astigmatism, some high-order astigmatism still remains, thus making it difficult to maintain sufficient field angle.

Condition (4) denotes the range of the conic constant. If the conic constant exceeds the upper limit or is below the lower limit, it is difficult to simultaneously correct the spherical and coma abberations. Furthermore, a large aberration is generated when the first and second surfaces horizontally deviate from each other.

Preferred embodiments No. 1 through No. 7 of the single lens according to the invention are shown below. In each of the embodiments, the aspherical surface is expressed as follows:

$$X = \frac{Ch^2}{1 + \sqrt{1 - (1 + Kj) C^2 h^2}} + \sum_{i=2} A_{2i}^{(j)} h^{2i}$$

where
X: distance from a tangential plane at the vertex of the aspherical surface to a point on the aspherical surface at a height h from the optical axis
h: height from the optical axis
C: surface curvature at the vertex of the aspherical surface (=1/R)
Kj: conic constant of j-th surface
$A_{2i}^{(j)}$: 2i-th order aspherical surface coefficient of j-th surface (i denotes an integer of at least 2)

The preferred embodiments Nos. 1 through 7 each use the following reference characters:
Rj: radius of curvature of j-th surface
d: thickness of the lens
m: magnification
n: refractive index of the lens with respect to wavelength of 780 nm
f: focal length of the lens
W.D.: working distance The recording disk used has a thickness t of 1.2 mm and a refractive index of 1.57221 with respect to wavelength of 780 nm.

FIGS. 3 through 9 respectively show the abberations observed in the preferred embodiments Nos. 1 through 7. In each of FIGS. 3 through 9, (a) shows spherical abberation and (b) astigmatism. Charts (c) through (e) show coma abberations with respect to angles of view of 1.0, 0.5 and 0.0, respectively. In each chart (a) showing spherical abberation, the solid line represents the spherical abberation, whereas the broken line represents a sine-wave condition. In each chart (b) showing astigmatism, the solid line represents the sagittal curvature of field, whereas the broken line represents the meridional curvature of field. In each of the charts (c) through (e) showing coma abberation, the solid line represents the meridional coma abberation, whereas the broken line represents the sagittal coma abberation. Each abberation is expressed in terms of millimeters. As is clear from respective aberration charts, each abberation is significantly small in any one of the preferred embodiments Nos. 1 through 7.

| Preferred Embodiment No. 1 | |
|---|---|
| f = 4.0 | W.D. = 2.038136 |
| d = 4.2 | n = 1.61469 |
| m = −0.2 | d/f = 1.05 |
| First surface | Second surface |
| $R_1 = 3.2$ | $R_2 = -5.3111$ |
| $K_1 = 0.150002$ | $K_2 = -11.4616$ |
| $A_4^{(1)} = -3.68053 \times 10^{-3}$ | $A_4^{(2)} = 1.14305 \times 10^{-3}$ |
| $A_6^{(1)} = -3.01191 \times 10^{-4}$ | $A_6^{(2)} = -2.08737 \times 10^{-4}$ |
| $A_8^{(1)} = 1.73907 \times 10^{-6}$ | $A_8^{(2)} = 9.19832 \times 10^{-6}$ |
| $A_{10}^{(1)} = -5.05962 \times 10^{-6}$ | |

| Preferred Embodiment No. 2 | |
|---|---|
| f = 4.0 | W.D. = 2.18414 |
| d = 4.0 | n = 1.78569 |
| m = −0.2 | d/f = 1.0 |
| First surface | Second surface |
| $R_1 = 3.8$ | $R_2 = -9.755$ |
| $K_1 = 0.062211$ | $K_2 = 16.4482$ |
| $A_4^{(1)} = -1.99885 \times 10^{-3}$ | $A_4^{(2)} = 6.46581 \times 10^{-3}$ |
| $A_6^{(1)} = -1.04115 \times 10^{-4}$ | $A_6^{(2)} = -4.46152 \times 10^{-4}$ |
| $A_8^{(1)} = -5.53717 \times 10^{-6}$ | $A_8^{(2)} = 1.06107 \times 10^{-6}$ |
| $A_{10}^{(1)} = -2.10252 \times 10^{-7}$ | |
| $A_{12}^{(1)} = -1.20303 \times 10^{-8}$ | |
| $A_{14}^{(1)} = 4.68164 \times 10^{-10}$ | |
| $A_{16}^{(1)} = -9.88946 \times 10^{-11}$ | |
| $A_{18}^{(1)} = 6.99966 \times 10^{-12}$ | |
| $A_{20}^{(1)} = -8.75783 \times 10^{-13}$ | |

| Preferred Embodiment No. 3 | |
|---|---|
| f = 4.0 | W.D. = 1.60625 |
| d = 4.6 | n = 1.78569 |
| m = −0.125 | d/f = 1.15 |
| First surface | Second surface |
| $R_1 = 3.8$ | $R_2 = -8.4926$ |
| $K_1 = 0.407522$ | $K_1 = 13.0263$ |
| $A_4^{(1)} = -2.77029 \times 10^{-3}$ | $A_4^{(2)} = 8.99115 \times 10^{-3}$ |
| $A_6^{(1)} = -2.06423 \times 10^{-4}$ | $A_6^{(2)} = -1.21495 \times 10^{-3}$ |
| $A_8^{(1)} = -7.0466 \times 10^{-6}$ | $A_8^{(2)} = 2.37092 \times 10^{-4}$ |
| $A_{10}^{(1)} = -2.30016 \times 10^{-6}$ | |

| Preferred Embodiment No. 4 | |
|---|---|
| f = 4.0 | W.D. = 1.929225 |
| d = 3.8 | n = 1.684429 |
| m = −0.125 | d/f = 0.95 |
| First surface | Second surface |
| $R_1 = 3.4$ | $R_2 = -7.6721$ |
| $K_1 = 0.90252$ | $K_2 = 15.8112$ |
| $A_4^{(1)} = -5.27421 \times 10^{-3}$ | $A_4^{(2)} = 1.03076 \times 10^{-2}$ |
| $A_6^{(1)} = -5.17669 \times 10^{-4}$ | $A_6^{(2)} = -5.50378 \times 10^{-4}$ |
| $A_8^{(1)} = -8.11181 \times 10^{-5}$ | $A_8^{(2)} = 1.57230 \times 10^{-4}$ |
| $A_{10}^{(1)} = 2.32456 \times 10^{-5}$ | $A_{10}^{(2)} = 8.29788 \times 10^{-5}$ |
| $A_{12}^{(1)} = -2.15725 \times 10^{-5}$ | |
| $A_{14}^{(1)} = 8.92890 \times 10^{-6}$ | |
| $A_{16}^{(1)} = -2.35518 \times 10^{-6}$ | |
| $A_{18}^{(1)} = 3.36978 \times 10^{-7}$ | |
| $A_{20}^{(1)} = -2.16639 \times 10^{-8}$ | |

| Preferred Embodiment No. 5 | |
|---|---|
| f = 4.0 | W.D. = 2.06663 |
| d = 3.8 | n = 1.61469 |
| m = −0.125 | d/f = 0.95 |
| First surface | Second surface |
| $R_1 = 3.1$ | $R_2 = -6.34$ |
| $K_1 = 0.18994$ | $K_2 = -7.38611$ |
| $A_4^{(1)} = -3.7531 \times 10^{-3}$ | $A_4^{(2)} = 4.6524 \times 10^{-3}$ |
| $A_6^{(1)} = -3.77662 \times 10^{-4}$ | $A_6^{(2)} = -1.14388 \times 10^{-3}$ |
| $A_8^{(1)} = -2.59548 \times 10^{-6}$ | $A_8^{(2)} = 1.05207 \times 10^{-4}$ |
| $A_{10}^{(1)} = -7.74807 \times 10^{-6}$ | $A_{10}^{(2)} = 1.36623 \times 10^{-6}$ |

| Preferred Embodiment No. 6 | |
|---|---|
| f = 4.0 | W.D. = 2.66214 |
| d = 4.6 | n = 1.785691 |
| m = −0.35 | d/f = 1.15 |
| First Surface | Second Surface |
| $R_1 = 4.1$ | $R_2 = -6.816$ |
| $K_1 = 0.58024$ | $K_2 = 2.13568$ |
| $A_4^{(1)} = -3.11733 \times 10^{-3}$ | $A_4^{(2)} = 5.83291 \times 10^{-3}$ |
| $A_6^{(1)} = -1.68631 \times 10^{-4}$ | $A_6^{(2)} = -5.19808 \times 10^{-4}$ |
| $A_8^{(1)} = -1.8999 \times 10^{-6}$ | $A_8^{(2)} = 2.84781 \times 10^{-5}$ |
| $A_{10}^{(1)} = -1.81188 \times 10^{-6}$ | $A_{10}^{(2)} = 1.46632$ |

| Preferred Embodiment No. 7 | |
|---|---|
| f = 4.0 | W. D. = 2.57216 |
| d = 4.7 | n = 1.68443 |
| m = −0.35 | d/f = 1.175 |
| First surface | Second surface |
| $R_1 = 3.7$ | $R_2 = -5.0933$ |
| $K_1 = 0.32002$ | $K_2 = 0.463027$ |
| $A_4^{(1)} = -3.71287 \times 10^{-3}$ | $A_4^{(2)} = 8.17174 \times 10^{-3}$ |
| $A_6^{(1)} = -1.73500 \times 10^{-4}$ | $A_6^{(2)} = -9.20368 \times 10^{-4}$ |
| $A_8^{(1)} = -1.34883 \times 10^{-5}$ | $A_8^{(2)} = 9.60691 \times 10^{-5}$ |
| $A_{10}^{(1)} = -3.42637 \times 10^{-7}$ | $A_{10}^{(2)} = -4.54728 \times 10^{-6}$ |
| $A_{12}^{(1)} = -1.37009 \times 10^{-7}$ | |
| $A_{14}^{(1)} = 2.71986 \times 10^{-8}$ | |
| $A_{16}^{(1)} = -6.55787 \times 10^{-9}$ | |
| $A_{18}^{(1)} = 7.06106 \times 10^{-10}$ | |
| $A_{20}^{(1)} = -4.01949 \times 10^{-11}$ | |

Figure 10:
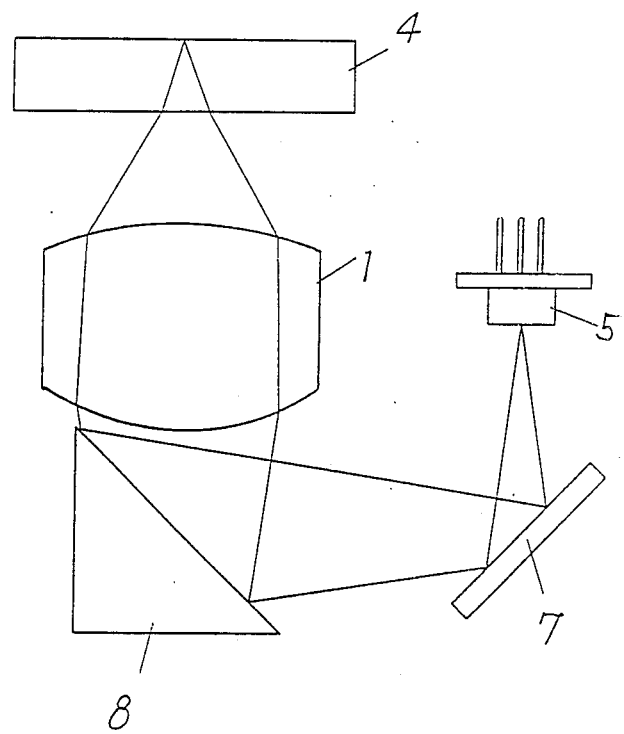
FIG. 10 is a simplified schematic side view of another optical pickup incorporating a single lens of the invention as its objective lens.

FIG. 10 is a simplified schematic side view of another optical pickup incorporating the single lens of the invention. The pickup is made compact by inserting a mirror 7 and a prism 8 between the semiconductor laser diode 5 and the single objective lens 1. If the positions of the semiconductor laser diode 5, mirror 7 and prism 8 deviate from each other, the relative positions of the lens 1 and the semiconductor laser diode 5 will eventually deviate. However, since the single lens embodied by the invention has an extremely wide field angle, such positioning errors of the semiconductor laser diode 5, mirror 7 and prism 8 are allowable.

What is claimed is:

1. A single lens having first and second aspherical surfaces each having a positive power, satisfying the following conditions:

$$0.1 < |m| < 0.5 \quad (1)$$

$$0.9 < (d/f) < 1.2 \quad (2)$$

where
  m denotes magnification;
  d denotes thickness of the lens; and
  f denotes focal length of the lens.

2. The single lens in accordance with claim 1, having a refractive index n satisfying a condition of 1.6 < n.

3. The single lens in accordance with claim 1, wherein the first surface has a conic constant $K_1$ satisfying a condition of $0 < K_1 < 1$ under the condition that the aspherical surface is expressed by the following equation:

$$X = \frac{Ch^2}{1 + \sqrt{1 - (1 + K) C^2 h^2}} + \sum_{i=2} A_{2i} h^{2i}$$

where
  X denotes a distance from a tangential plane at the vertex of the aspherical surface to a point on the aspherical surface at a height h from the optical axis of the lens;
  h denotes the height from the optical axis;
  C denotes surface curvature at the vertex of the aspherical surface;
  K denotes conic constant; and
  $A_{2i}$ denotes 2i-th order aspherical surface coefficient, in which i represents an integer of at least 2.

* * * * *